(12) United States Patent
Lee

(10) Patent No.: US 7,616,566 B2
(45) Date of Patent: Nov. 10, 2009

(54) DATA FLOW CONTROL APPARATUS AND METHOD OF MOBILE TERMINAL FOR REVERSE COMMUNICATION FROM HIGH SPEED COMMUNICATION DEVICE TO WIRELESS NETWORK

(75) Inventor: Hyun-Gu Lee, Yongin-si (KR)

(73) Assignee: Samsung Electroncis Co., Ltd (KR)

( * ) Notice: Subject to any disclaimer, the term of this patent is extended or adjusted under 35 U.S.C. 154(b) by 363 days.

(21) Appl. No.: 11/796,326

(22) Filed: Apr. 27, 2007

(65) Prior Publication Data

US 2007/0258362 A1 Nov. 8, 2007

(30) Foreign Application Priority Data

Apr. 28, 2006 (KR) .................. 10-2006-0039046

(51) Int. Cl.
*H04Q 7/32* (2006.01)

(52) U.S. Cl. ................... 370/230.1; 370/310

(58) Field of Classification Search ........ None
See application file for complete search history.

(56) References Cited

U.S. PATENT DOCUMENTS

| | | | | |
|---|---|---|---|---|
| 6,463,034 B1 * | 10/2002 | Abrol et al. | .......... | 370/229 |
| 6,483,822 B1 * | 11/2002 | Lioy et al. | .......... | 370/329 |
| 6,625,164 B1 * | 9/2003 | Lioy et al. | .......... | 370/465 |
| 6,760,804 B1 * | 7/2004 | Hunt et al. | .......... | 710/313 |
| 7,515,602 B2 * | 4/2009 | Shin | .......... | 370/463 |

FOREIGN PATENT DOCUMENTS

| | | |
|---|---|---|
| JP | 07-087159 | 3/1995 |
| JP | 2001-292410 | 10/2001 |
| KR | 1020060088790 | 8/2006 |
| KR | 1020060092823 | 8/2006 |

\* cited by examiner

*Primary Examiner*—Min Jung
(74) *Attorney, Agent, or Firm*—The Farrell Law Firm, LLP

(57) ABSTRACT

A data flow control apparatus of a mobile terminal that performs reverse communication from a high speed communication device to a wireless network. An Rm interface unit receives data from the high speed communication device and buffers the received data in a byte stream format. An Operating System (OS) device driver includes a first packet buffer queue for reading and storing data buffered in the Rm interface unit upon receipt of an interrupt from the Rm interface unit. The OS device driver manages a first linked list for managing data stored in the first packet buffer queue. A Um interface unit includes a second packet buffer queue having the same buffer structure as that of the first packet buffer queue. The Um interface unit manages a second linked list for managing data stored in the second packet buffer queue, converts the data stored in the second packet buffer queue into a frame format, and transmits the frame-format data to a wireless network. A packet processor de-links an address of the data stored in the first packet buffer queue from the first linked list, and links an address of the de-linked data to the second linked list, to deliver the data from the first packet buffer queue to the second packet buffer queue. A controller controls data flow of the first packet buffer queue.

11 Claims, 9 Drawing Sheets

DATA FLOW CONTROL APPARATUS AND METHOD OF MOBILE TERMINAL FOR REVERSE COMMUNICATION FROM HIGH SPEED COMMUNICATION DEVICE TO WIRELESS NETWORK

PRIORITY

This application claims priority under 35 U.S.C. § 119(a) to a Korean Patent Application filed in the Korean Intellectual Property Office on Apr. 28, 2006 and assigned Serial No. 2006-39046, the disclosure of which is incorporated herein by reference.

BACKGROUND OF THE INVENTION

1. Field of the Invention

The present invention relates generally to an apparatus and method for controlling data flow in a mobile terminal of a wireless network, and in particular, to a data flow control apparatus and method of a mobile terminal for transmitting data of a high speed communication device, such as a computer device, to a wireless network via a mobile terminal.

2. Description of the Related Art

A wireless network transmits desired transmission data over the air through a specific frequency. With the progress of multimedia technology, the wireless network is developing into a system capable of transmitting high speed packet data. In order to meet various service requirements of users, a terminal of the wireless network is evolving into a complex communication device that can be connected to a general-purpose computer device by wire or wirelessly to perform data exchange, or can function as a wireless modem for accessing the wireless Internet via, for example, a notebook computer.

When a Mobile Terminal (MT) is used as a wireless modem to transmit data output from a high speed communication device (hereinafter a "Terminal Equipment (TE)") such as a computer device (or Personal Computer (PC)) to the wireless network, the MT is connected to the TE by wire or wirelessly and transmits the data output from the TE to a Base Station (BS) of the wireless network over a reverse link (or uplink).

In order to achieve data transmission from the TE to the BS, there is a need for communication interfaces for connecting the TE to the MT, and the MT to the BS by wire or wirelessly. In the wireless mobile communication standard, an interface for communication between the TE and the MT is defined as an Rm interface, and an interface for communication between the MT and the BS is defined as a Um interface.

In wireless communication technology, the Rm interface supports a data rate of several hundreds of Mbps according to various communication standards such as Universal Serial Bus (USB) Version 2.0, Fast Ethernet, and the like. The Um interface supports a data rate of a maximum of 1.8 Mbps in Evolution—Data Only (EV-DO), for a synchronous terminal, and supports a data rate of a maximum of 5.8 Mbps in High Speed Uplink Packet Access (HSUPA), for an asynchronous terminal. That is, the Um interface, compared with the Rm interface, supports a lower data rate.

Therefore, when the processed data from the TE is transmitted to a wireless network via the MT, a data transmission error may occur due to a rate difference between the Rm interface and the Um interface. The data transmission error occurs because as the data received via the higher-rate Rm interface on a burst basis experiences data bottleneck in the lower-rate Um interface, buffer overflow or buffer underrun may occur instantaneously. Therefore, in order to minimize the occurrence of the data transmission error due to the rate difference between the Rm interface and the Um interface, there is a need for a data flow control scheme capable of stably controlling data flow between the Rm interface and the Um interface.

A description will now be made of a data flow control apparatus of a conventional mobile terminal using the Rm interface and the Um interface, with reference to FIG. 1.

Referring to FIG. 1, a data flow control apparatus 100 included in an MT includes an Rm interface unit 110 as a communication interface between a TE 101 and the MT and a Um interface unit 170 as a communication interface between the MT and a BS 102, to perform reverse transmission from the TE 101 to the BS 102.

In reverse communication, the Rm interface unit 110 is an interface for receiving data from the TE 101. The Rm interface unit 110 includes therein a buffer for temporarily storing data received from the TE 101, and performs basic flow control based on a watermark. An Operating System (OS) device driver 130 reads data delivered from the Rm interface unit 110, and stores it in a buffer in the MT. The OS device driver 130 can have access to upper layer modules via an OS Application Program Interface (API). A packet processor 150 performs a process of converting the data that the OS device driver 130 has copied in byte stream format, into a packet format. The Um interface unit 170 is an interface for transmitting the data in the packet format received from the packet processor 150 to the BS 102. A controller 190 controls the overall operation of communication and additional functions achieved in the data flow control apparatus 100, and particularly controls the flow of data transmitted from the Rm interface unit 110 via the OS device driver 130, the packet processor 150 and the Um interface unit 170.

FIG. 2 illustrates a data transmission process in the data flow control apparatus 100 shown in FIG. 1. In FIGS. 1 and 2, the same or similar elements are denoted by the same reference numerals even though they are depicted in different drawings.

Referring to FIG. 2, an Rm interface unit 110, including a First-In-First-Out (FIFO) buffer 111, buffers the data received from a TE 101 in the FIFO buffer 111 to temporarily store it in a byte stream. If the amount of data stored in the FIFO buffer 111 is greater than or equal to a reference amount, the Rm interface unit 110 sends an interrupt signal to an OS device driver 130.

The OS device driver 130, paged through the interrupt signal, reads data from the FIFO buffer 111, and stores the read data in a byte stream buffer 131 in the byte stream format. The byte stream buffer 131 should have a buffer capacity corresponding to the maximum amount of packet, expected to prevent a loss of a data packet received from the TE 101. In addition, after storing the data in the byte stream buffer 131, the OS device driver 130 sends an event signal indicating the data storing to a packet processor 150, which is its upper layer. In this process, the OS device driver 130 performs a Clear-To-Send (CTS) control that restricts data transmission from the TE 101 to prevent a data loss when the amount of data stored in the byte stream buffer 131 is greater than or equal to a reference amount.

The packet processor 150 copies as much data as needed in the byte stream buffer 131 using an OS API. The copied byte stream-format data is converted into packet-format data, and then added to a packet buffer field in a packet buffer queue 153 allocated in a packet buffer pool 151. That is, every time the copied data is converted into packet-format data, the packet processor 150 stores the corresponding packet in its own packet buffer queue 153 for efficient packet processing.

A Um interface unit 170, including a byte stream buffer 171, stores the copied data from the packet processor 150 in the byte stream buffer 171, converts the data into a frame format suitable for the wireless network transmission standard, and then transmits the frame-format data to a BS 102.

In the data flow control apparatus 100 of FIG. 2, in order to buffer the packet-format data and the byte stream-format data independently, the OS device driver 130 and the Um interface unit 170 include byte stream buffers 131 and 171, respectively, and the packet processor 150 includes the packet buffer pool 151 and the packet buffer queue 153. Therefore, in the conventional data flow control apparatus 100, as the modules participating in the reverse transmission path from the Rm interface unit 110 to the Um interface unit 170 use different buffer structures, consistent and correct flow control is hard to implement.

Further, in the conventional data flow control apparatus 100, the controller 190 needs the interfaces capable of individually controlling the modules that use the different buffer structures. That is, when a buffer-full state occurs in the Um interface unit 170, the controller 190 sends an interrupt request signal for data transmission to the TE 101, and the interrupt request signal is delivered to the Rm interface unit 110 in degrees, so that data transmission interrupt is performed according to CTS control.

However, because the data flow control process performed in the controller 190 is performed through task scheduling between the modules of the data flow control apparatus 100, a time difference occurs when the buffer-full state of the Um interface unit 170 is reflected in the Rm interface unit 110, so the data flow control cannot be achieved at the desired time in real time. Therefore, the conventional data flow control apparatus 100 accumulates an unnecessarily large amount of data in each protocol stack, causing retransmission in the upper layer and thus causing performance degradation.

In addition, the time difference occurring in the conventional flow control process delays a data-receivable state in the Rm interface unit 110 even when the FIFO buffer 111 in the Rm interface unit 110 is emptied, thereby causing buffer underrun in which data transmission to the BS 102 is temporarily interrupted.

In the conventional data flow control apparatus, because flow control is performed without the information indicating the amount of packet data accumulated in the upper layer as described above, there is a possibility that buffer overflow and underrun will occur in the Um interface unit, and due to the difficulty in expecting that possibility, there is a burden of securing the more-than-necessary buffer capacity. However, the increase in memory capacity of a terminal can be a direct cause of decreasing the price competitiveness of the terminal, and the overflow and the underrun may cause performance degradation in packet transmission. In addition, because the conventional technique, in which different modules manage buffers having different structures, should infringe S/W (software) independence of each module in order to share buffer information of other modules, it is hard to measure residual buffer capacity of the data accumulated in the entire reverse link in real time and to control data flow. Alternatively, it is also possible to perform the flow control between the modules through feedback messages. In this case, however, for buffer control, it is necessary to match synchronization in real time.

That is, in the conventional data flow control apparatus, because flow control is distributed in each module and the flow control is not achieved at an appropriate time, there is a high possibility that a decrease in data rate and a change in transmission may occur. Therefore, complex processing is needed to solve these problems. In addition, because there is a possibility that a processing load of the controller may increase due to the buffer copy (i.e. data copy) performed in a process of delivering the packet stored in the Rm interface unit to the upper layer and the increase in the processing load may cause performance degradation in high speed data communication to be upgraded later, there is a need for a solution for these problems.

SUMMARY OF THE INVENTION

An aspect of the present invention is to address at least the problems and/or disadvantages described above and to provide at least the advantages described below. Accordingly, an aspect of the present invention is to provide an apparatus and method for stably controlling data flow in a mobile terminal that performs reverse communication from a high speed communication device (or Terminal Equipment (TE)) to a wireless network.

Another aspect of the present invention is to provide an apparatus and method for performing optimal data flow control in a mobile terminal that performs reverse communication from a high speed communication device to a wireless network.

Another aspect of the present invention is to provide a data flow control apparatus and method for providing stable performance in high speed packet data communication.

According to one aspect of the present invention, there is provided a data flow control apparatus of a mobile terminal that performs reverse communication from a high speed communication device to a wireless network. The data flow control apparatus includes an Rm interface unit for receiving data from the high speed communication device and buffering the received data in a byte stream format; an Operating System (OS) device driver including a first packet buffer queue for reading and storing data buffered in the Rm interface unit upon receipt of an interrupt from the Rm interface unit, wherein the OS device driver manages a first linked list for managing data stored in the first packet buffer queue; a Um interface unit including a second packet buffer queue having the same buffer structure as that of the first packet buffer queue, wherein the Um interface unit manages a second linked list for managing data stored in the second packet buffer queue, converts the data stored in the second packet buffer queue into a frame format, and transmits the frame-format data to a wireless network; a packet processor for de-linking an address of the data stored in the first packet buffer queue from the first linked list, and linking an address of the de-linked data to the second linked list, to deliver the data from the first packet buffer queue to the second packet buffer queue; and a controller for controlling data flow of the first packet buffer queue.

According to another aspect of the present invention, there is provided a data flow control method of a mobile terminal that includes an Rm interface unit for communication with a high speed communication device and a Um interface unit for communication with a wireless network to perform reverse communication from the high speed communication device to the wireless network. The data flow control method includes receiving data from the high speed communication device and buffering the received data in the Rm interface unit in a byte stream format; paging an Operating System (OS) device driver in response to an interrupt from the Rm interface unit, reading data buffered in the Rm interface unit, and storing the read data in a first packet buffer queue in the OS device driver; de-linking an address of the data stored in the first packet buffer queue from a first linked list for managing the first packet buffer queue, and linking an address of the de-linked data to a second linked list for managing a second packet buffer queue included in the Um interface unit, to deliver the data from the first packet buffer queue to the second packet buffer queue; and converting data stored in the second packet buffer queue into a frame format, and transmitting the frame-format data from the Um interface unit to a wireless network.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Figure 1:
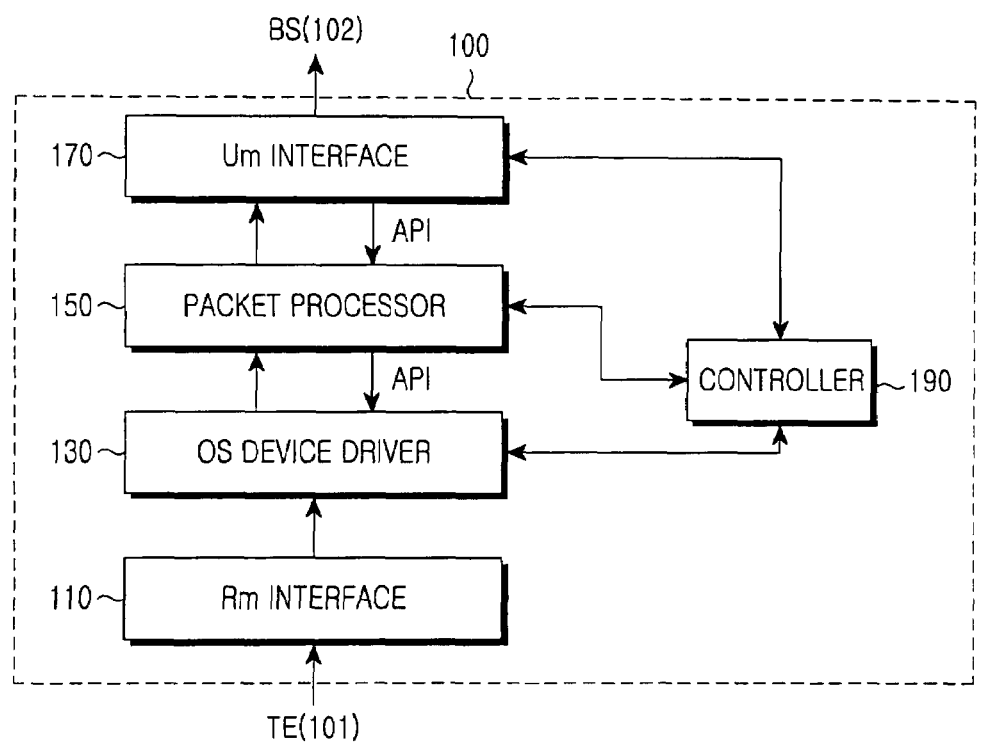
FIG. 1 is a block diagram illustrating a structure of a data flow control apparatus in a conventional mobile terminal.
Figure 2:
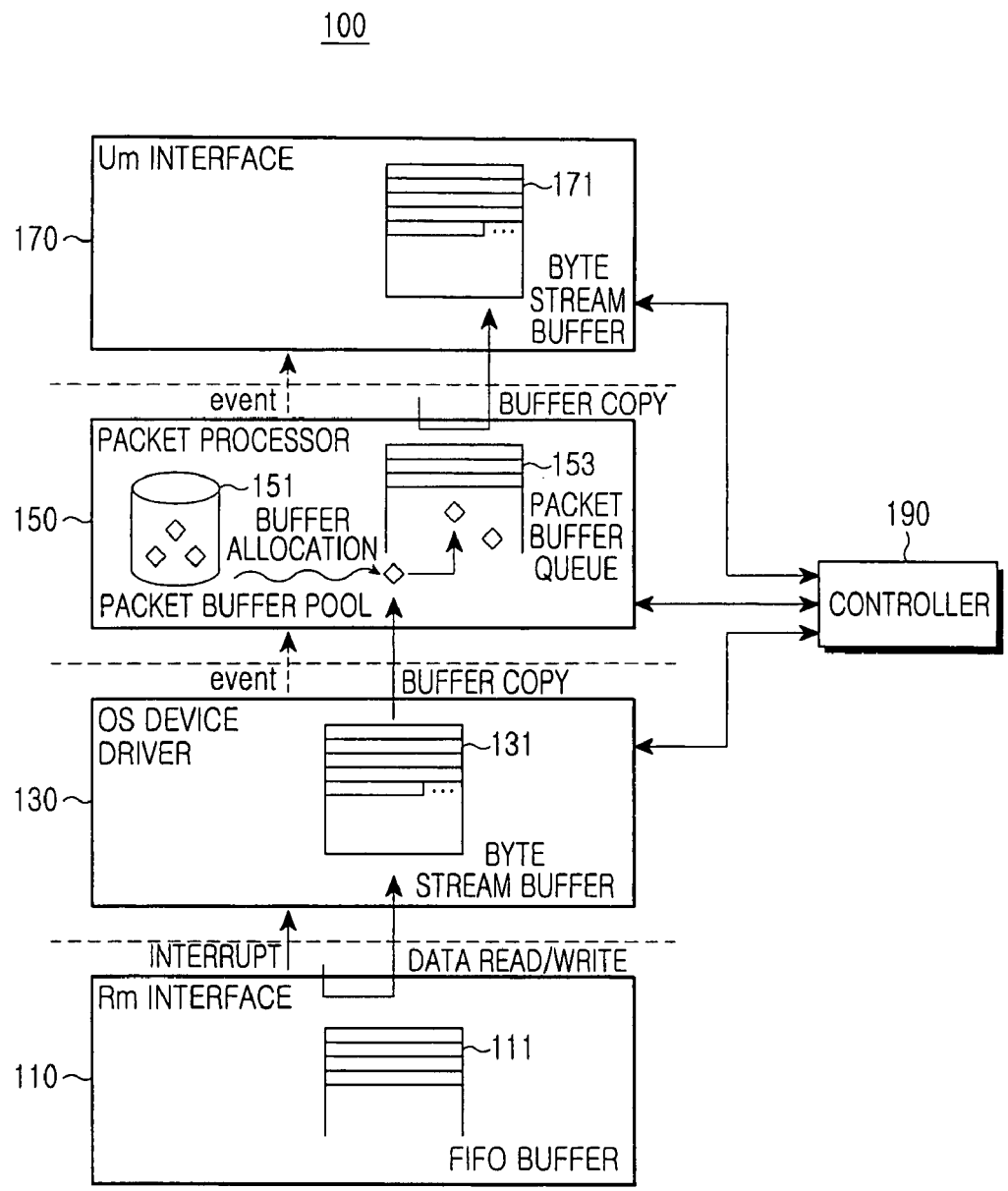
FIG. 2 is a block diagram illustrating a data transmission process in the data flow control apparatus shown in FIG. 1.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The basic concept of the present invention will first be described. The present invention unifies structures of buffers arranged in a transmission path ranging from an Rm interface unit to a Um interface unit in a data flow control apparatus so as to optimize flow control of transmission data at a mobile terminal which is connected to a high speed communication device (Terminal Equipment (TE)) that performs data communication via a USB port at high speed, to perform reverse communication to a wireless network. In this manner, the present invention can solve the problems of overflow and/or underrun which frequently occur in the prior art due to the use of the different buffers; and omit the buffer copy operation between adjacent modules, thereby reducing a load of a controller.

In addition, the present invention calculates an optimal buffer capacity capable of preventing underrun occurring in the Um interface unit of the data flow control apparatus, depending on the maximum delay time for which a packet is delivered from the TE to the Um interface unit.

Figure 3:
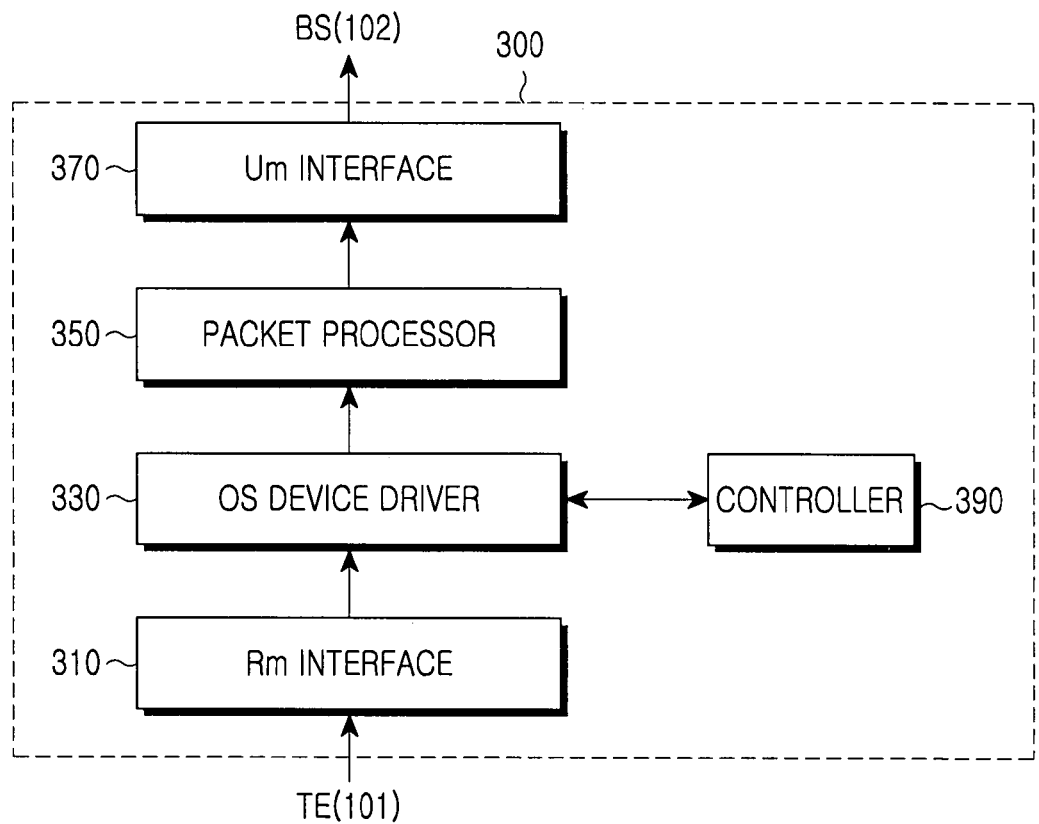
FIG. 3 is a block diagram illustrating a structure of a data flow control apparatus in a mobile terminal according to an embodiment of the present invention.

FIG. 3 illustrates a structure of a data flow control apparatus in a mobile terminal according to an embodiment of the present invention.

Referring to FIG. 3, an Rm interface unit 310 is an interface, like USB, for receiving data from a TE 101. An OS device driver 330 reads data from the Rm interface unit 310, stores the data in its packet buffer queue (not shown), and then delivers the stored data to a packet processor 350. The novel OS device driver 330, unlike the conventional OS device driver 130 described in FIG. 1, does not need a data conversion operation from packet format into byte stream format. The packet processor 350 delivers the data stored in the packet buffer queue to a Um interface unit 370 in packet format through link shifting.

The Um interface unit 370 is an interface, like Radio Link Protocol (RLP) and Media Access Control (MAC), for receiving data received from the TE 101 through the packet processor 350 in packet format and transmitting the received data to a BS 102.

A controller 390 controls the overall operation of communication and additional functions, and controls data flow of the OS device driver 330.

Figure 4:
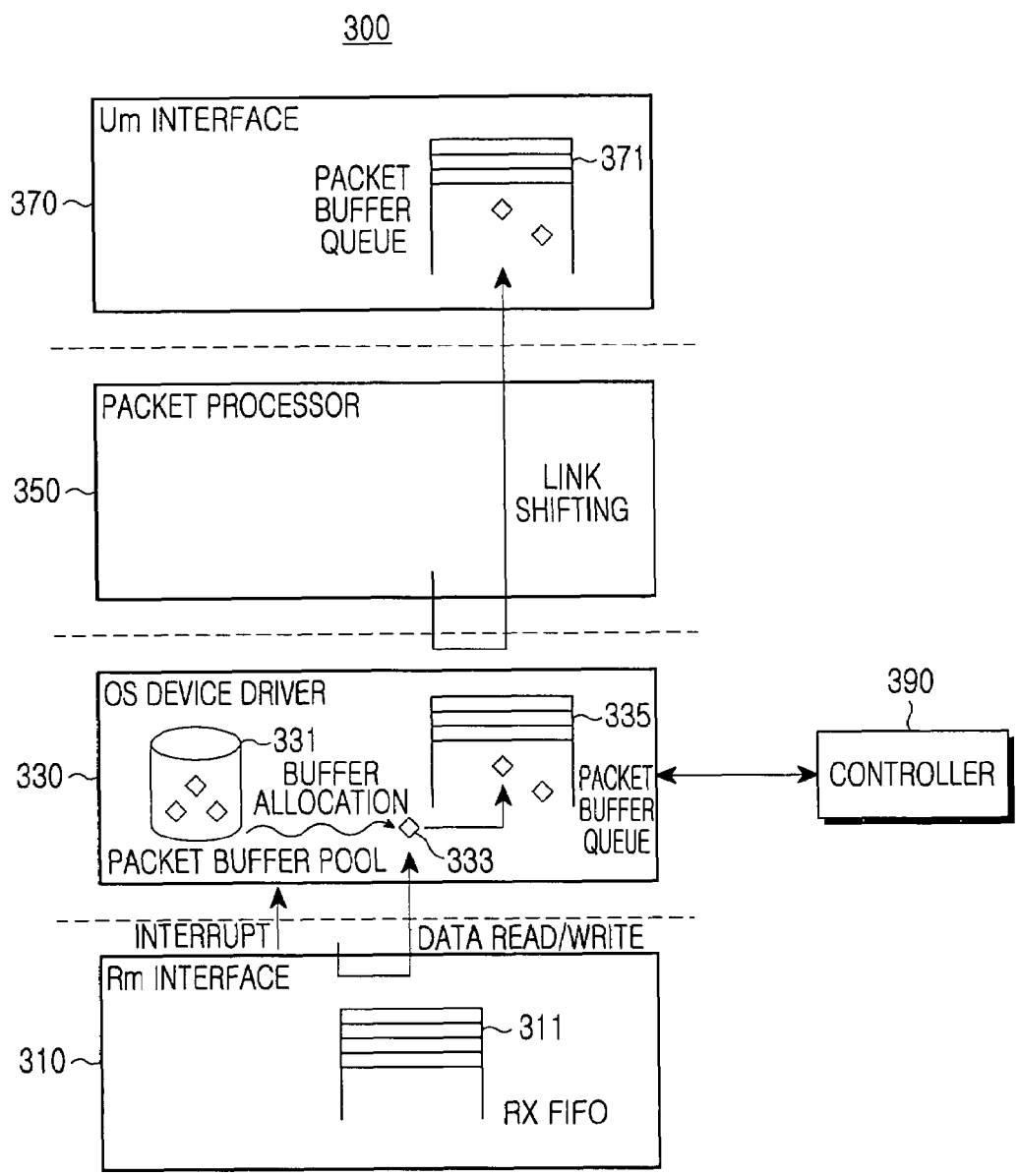
FIG. 4 is a diagram illustrating a data transmission process in the data flow control apparatus shown in FIG. 3.

FIG. 4 illustrates a data transmission process in the data flow control apparatus 300 shown in FIG. 3. Referring to FIG. 4, an Rm interface unit 310, including a FIFO buffer 311, buffers the data received from a TE 101 in the FIFO buffer 311 to temporarily store it in the byte stream format. If the amount of data stored in the FIFO buffer 311 is greater than or equal to a reference amount, the Rm interface unit 310 sends an interrupt signal to an OS device driver 330.

The OS device driver 330, paged through the interrupt signal, reads data from the FIFO buffer 311, stores the read data in a packet buffer 333 allocated in a packet buffer pool 331, and puts it in a packet buffer queue 335. In this process, the OS device driver 330, under the control of a controller 390, performs novel Clear-To-Send (CTS) control that restricts data transmission from the TE 101 to prevent a data loss when the amount of data stored in the packet buffer queue 335 is greater than or equal to a reference amount. The novel CTS control estimates the time the packet buffer queue 335 is emptied, taking the data transmission characteristic of a Um interface unit 370 into account, and determines an optimal CTS waiting time so as to prevent a data loss when the amount of data stored in the packet buffer queue 335 in the OS device driver 330 is greater than or equal to a reference amount. The novel CTS control scheme will be described in detail with reference to FIG. 6. In addition, the OS device driver 330, together with the controller 390, can be configured in one block (or module).

A packet processor 350 performs data transmission from the OS device driver 330 to an upper layer only through link shifting. The packet processor 350 can convert the data from the packet buffer queue 335 into a packet-format data, if necessary.

The Um interface unit 370, including a packet buffer queue 371 which is similar in structure to the packet buffer queue 335 included in the OS device driver 330, converts the packet delivered from the packet processor 350 through link shifting into a frame format suitable for the wireless network transmission standard, and then transmits the frame-format data to a BS 102.

The data flow control apparatus 300 of FIG. 4 employs the structure-unified packet buffer queues 335 and 371 in the OS device driver 330 and the Um interface unit 370, respectively, so as to process transmission data in the packet format.

The packet buffer queue 335 in the OS device driver 330 is managed by first pointers to which reference is to be made by the OS device driver 330, and the packet buffer queue 371 in the Um interface unit 370 is managed by second pointers to which reference is to be made by the Um interface unit 370. Therefore, packet transmission from the OS device driver 330 to the Um interface unit 370 is performed by resetting the pointers in the packet processor 350, and this is referred to herein as 'link shifting'. As a result, the present invention can enable consistent buffer control by applying the generally unified packet buffer queue structure.

That is, the data received from the Rm interface unit 310 is finally delivered to the Um interface unit 370 by resetting the pointers of the packet buffer queue 335, while maintaining the same data format. The link shifting scheme of transmitting the data received from the Rm interface unit 310 to the Um interface unit 370 using the packet buffer queues 335 and 371 will be described in detail with reference to FIGS. 5A to 5C. Because the packet buffer capacity in use, allocated from the packet buffer pool 331 in the OS device driver 330, is equal to the total amount of data accumulated in a data stack, the new data flow control apparatus 300 can correctly perform flow control. In addition, the data flow control apparatus 300 is suitable for high speed data communication, as it does not need the conventional data copy operation between the modules.

Figure 5A:
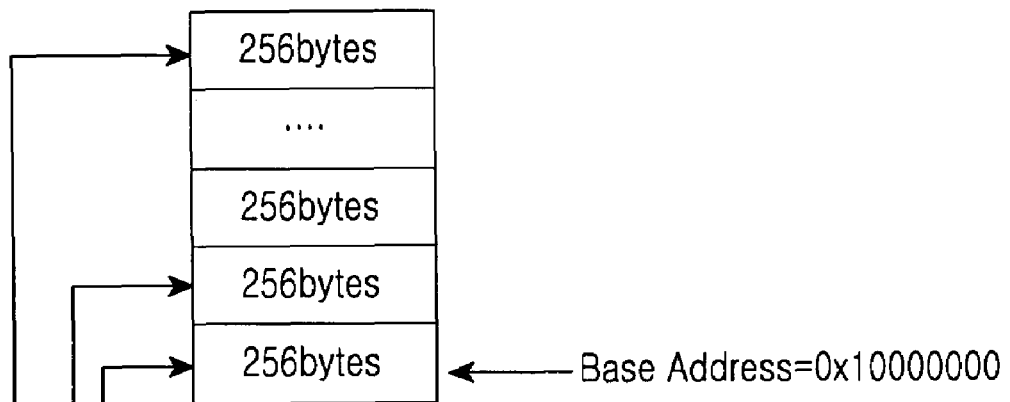
FIG. 5A is a diagram illustrating an initial state of a packet buffer pool in the OS device driver of FIG. 4.
Figure 5B:
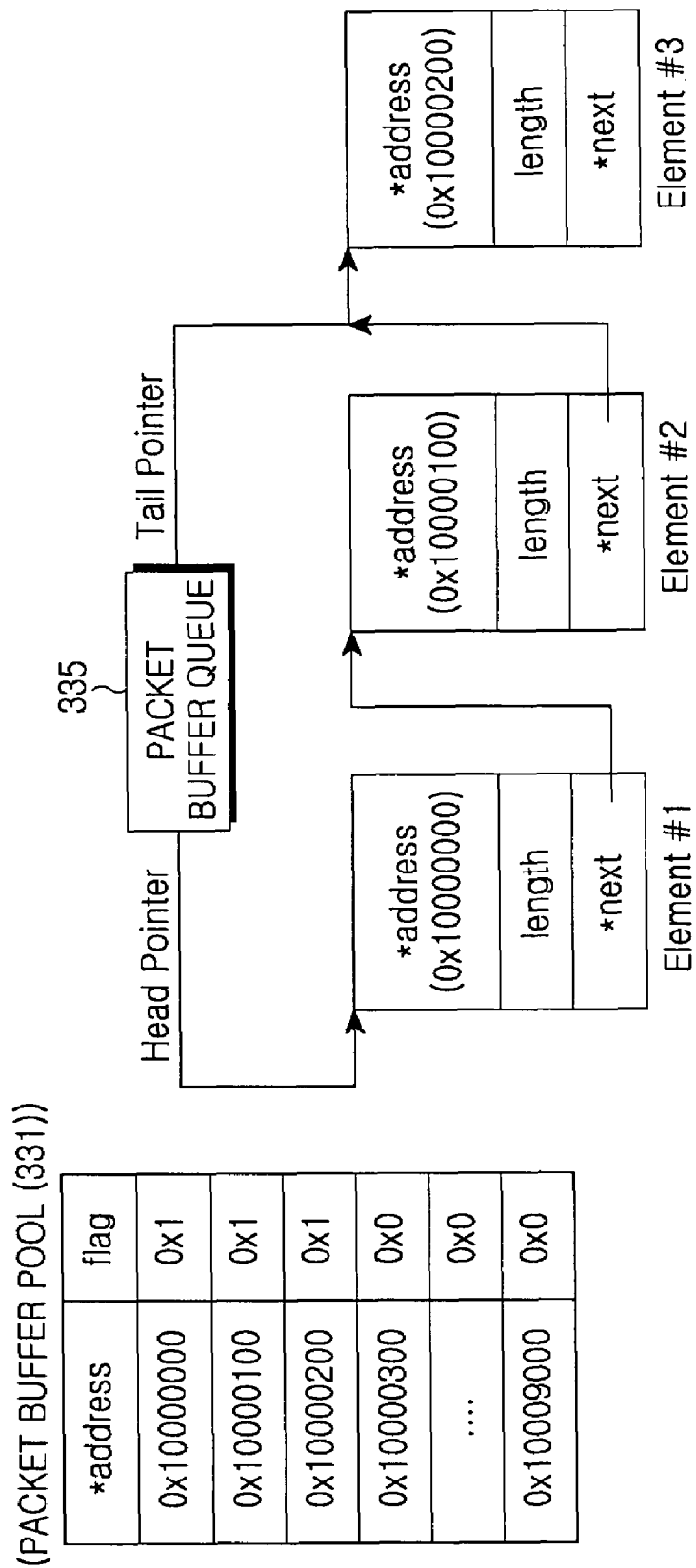
FIG. 5B is a diagram illustrating a structure of a packet buffer queue in the OS device driver of FIG. 4.
Figure 5C:
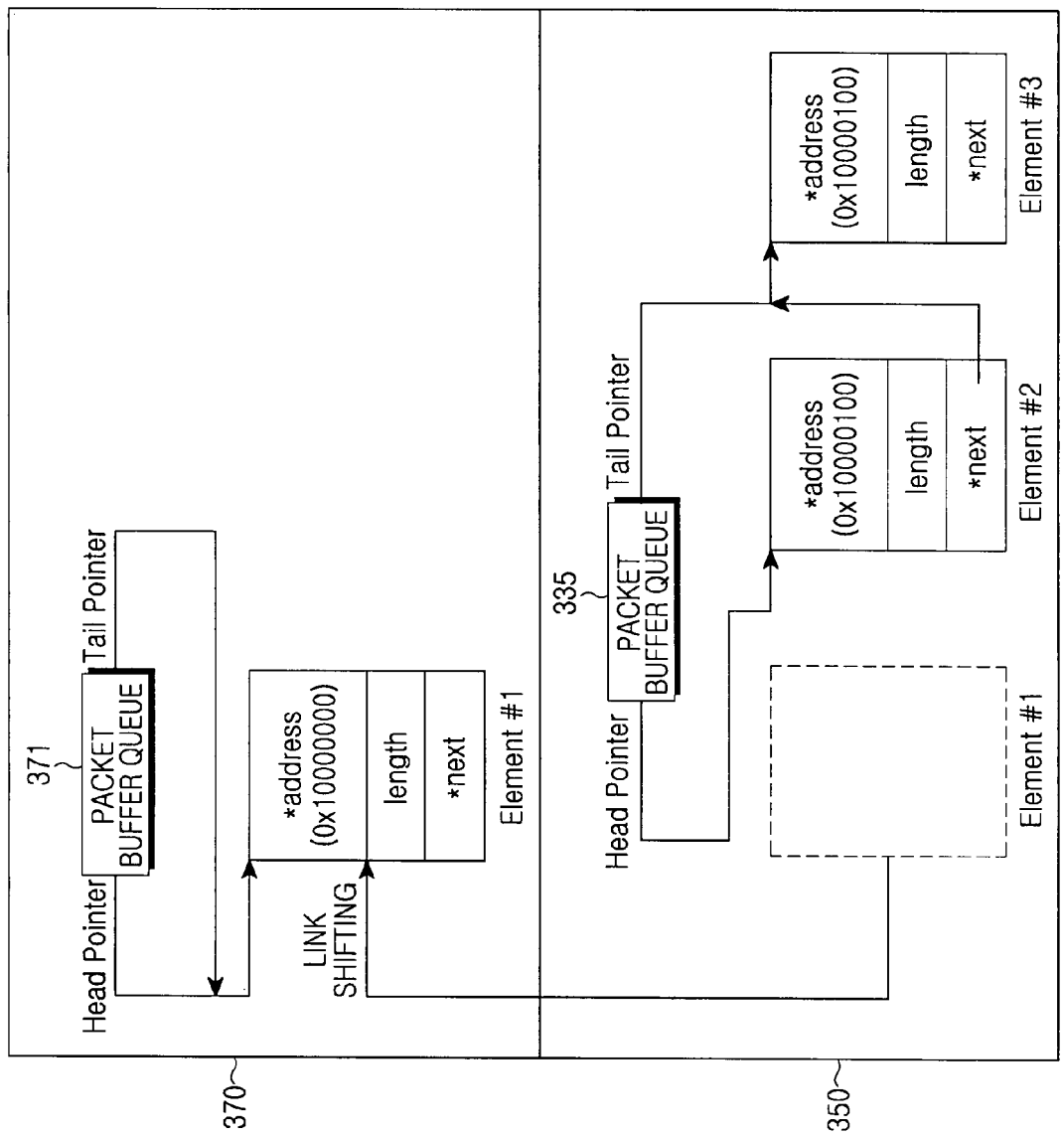
FIG. 5C is a diagram illustrating a scheme of performing link shifting in the packet processor of FIG. 4.

With reference to FIGS. 5A to 5C, a description will now be made of a scheme of transmitting the data received from the Rm interface unit 310 to the Um interface unit 370 using the packet buffer queues 335 and 371.

FIG. 5A illustrates an initial state of a packet buffer pool in the OS device driver of FIG. 4.

Referring to FIG. 5A, a packet buffer pool 331 is an entity for managing individual information on all packet buffer fields included in a packet buffer queue. Each packet buffer field is comprised of a 256-byte unit buffer. Accordingly, the packet buffer pool 331 manages individual address information and use state for all unit buffers included in the packet buffer queue.

In addition, records of the packet buffer pool 331 indicate addresses of the packet buffer fields. The use state of an unused packet buffer field in the packet buffer pool 331 and a returned packet buffer field is set as [Flag=0], and the use state of a used packet buffer field is set as [Flag=1]. In the initial state, flags for all records of the packet buffer pool 331 are set as '0', i.e. 'unused'.

FIG. 5B illustrates a structure of a packet buffer queue in the OS device driver of FIG. 4.

Referring to FIG. 5B, an OS device driver 330 is allocated, from a packet buffer pool 331, as many packet buffer fields as the amount of data received from a FIFO buffer 311. Each use state for records of the packet buffer fields allocated from the packet buffer pool 331 is set as [Flag=1], indicating 'used'. That is, every time the allocation and return of buffer fields occurs in the packet buffer pool 331, the number of packet buffer fields currently in use, i.e. use state, is managed.

In the packet buffer pool 331, the use state management scheme can be expressed as shown in FIG. 5B, by way of example. It is shown in FIG. 5B that the packet buffer pool 331 manages use states in which 3 packet buffer fields of '0x10000000', '0x10000100' and '0x10000200' are presently allocated.

The OS device driver 330, after storing data in the allocated packet buffer fields, links the packet buffer fields to a first head pointer and a first tail pointer of the packet buffer queue 335 as shown in FIG. 5B. In other words, the first head pointer of the packet buffer queue 335 points Element #1 storing an address '0x10000000' of a first packet buffer field being used in the OS device driver 330, and the first tail pointer points Element #3 storing an address '0x10000200' of the last packet buffer field being used in the OS device driver 330. The packet buffer queue 335 is configured in linked-list form, and each Element in the list stores the next pointer indicating an Element that manages information on an individual packet buffer field, i.e. an address of an individual packet buffer field, a size of data stored in an individual packet buffer field, and the next packet buffer field.

FIG. 5C illustrates a scheme of performing link shifting in the packet processor of FIG. 4.

Referring to FIG. 5C, a packet processor 350, if necessary, converts data in packet buffer fields linked to a packet buffer queue 335 into a packet format, and processes the packet-format data. If the packet conversion/processing is completed in the packet processor 350, the data in the corresponding packet buffer field is delivered to a Um interface unit 370 and then transmitted to the network. To this end, the data in the packet buffer field is re-linked to the pointers managed in the Um interface unit 370, without passing through memory copy. That is, in FIG. 5C, Element#1 in a linked list managed in an OS device driver 330 is de-linked from the linked list of the OS device driver 330, and then linked to a linked list managed in the Um interface unit 370. In other words, a first head pointer of the OS device driver 330 is reset so as to point to Element#2 rather than Element #1, and a second head pointer of the Um interface unit 370 is reset so as to point to Element #1. If there is only one packet buffer field managed by the Um interface unit 370, a second tail pointer of a packet buffer queue 371 points to the same position as that of the second head pointer.

As a result, the data in the packet buffer queue 335 remains unchanged even in the process where data is shifted from the OS device driver 330 to the packet buffer queue 371.

Figure 6:
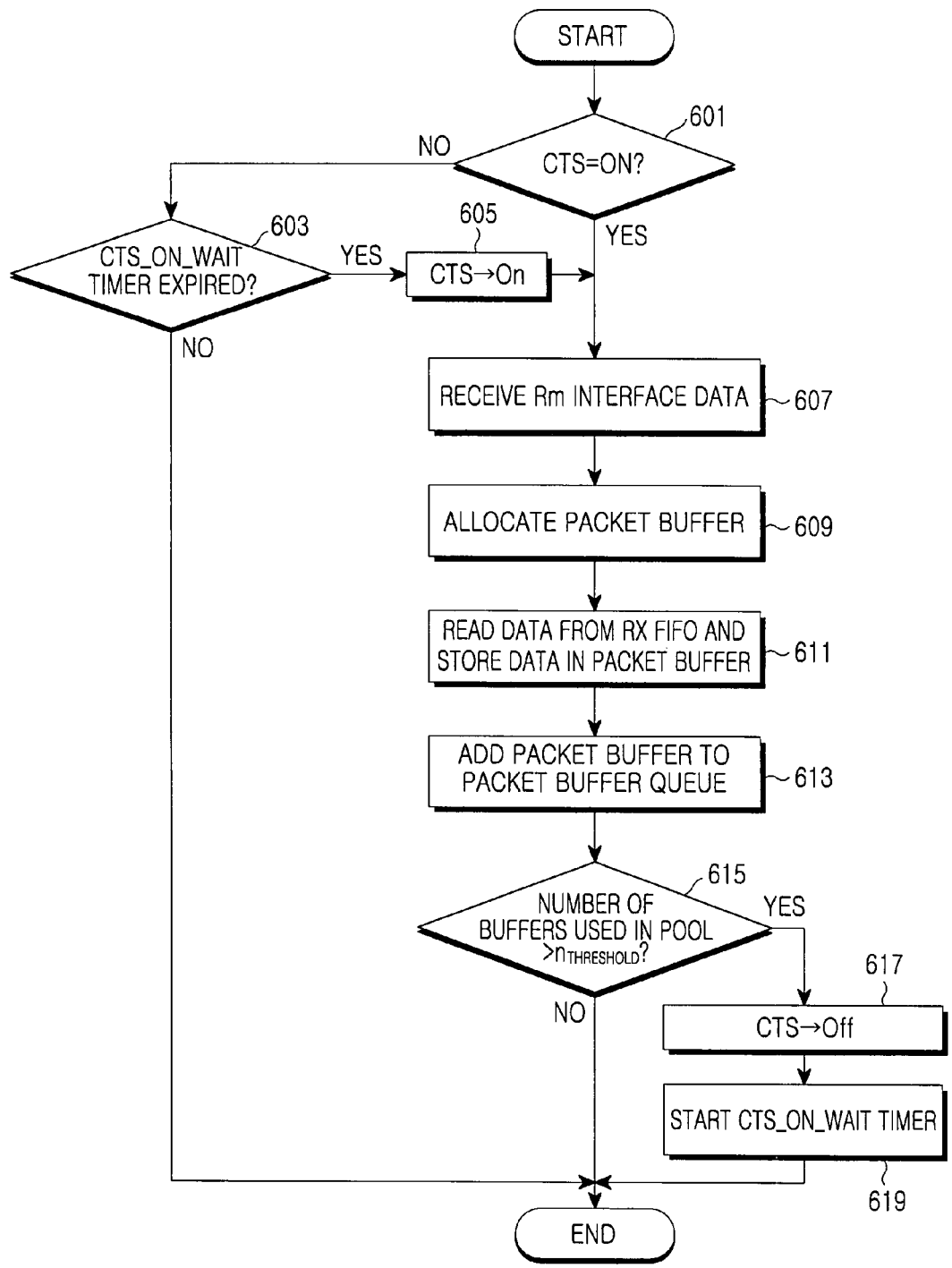
FIG. 6 is a flowchart illustrating an operation in the data flow control apparatus shown in FIG. 4.

FIG. 6 illustrates an operation in the data flow control apparatus shown in FIG. 4.

The term 'CTS control' as used herein refers to an operation of determining whether it is possible to receive data from a TE 101, and controlling a transmission operation of the TE 101 according to the determination result. In a CTS-On state, a data flow control apparatus 100 receives data from the TE 101. In a CTS-Off state, data transmission from the TE 101 is restricted.

In addition, a CTS waiting timer (or CTS_ON_WAIT timer) of FIG. 6 counts the time (hereinafter 'CTS waiting time') required when after CTS Off, data is delivered up to a Um interface unit 370 and then finally transmitted over the air. An optimal value of the CTS waiting time is determined by estimating the time required when a packet buffer queue is appropriately emptied, taking the data transmission characteristic of the Um interface unit 370 into account. That is, the CTS waiting time is provided for counting the optimal time required for returning from the CTS-Off state back to the CTS-On state.

Referring to FIG. 6, in step 601, controller 390 determines in step 601 whether the current state is a CTS-On state or a CTS-Off state. If the current state is a CTS-Off state, the controller 390 determines in step 603 whether a CTS waiting time set through a CTS_ON_WAIT timer has elapsed. If it is determined that the CTS waiting time has elapsed, the controller 390 transitions in step 605 to a CTS-On state and resumes data reception from the TE 101. However, if the CTS waiting time has not elapsed, the controller 390 keeps the CTS-Off state for the CTS waiting time and ends the process.

If it is determined in step 601 that the current state is not the CTS-Off state, an Rm interface unit 310 receives in step 607 the data transmitted from the TE 101. The received data is stored in FIFO buffer 311. If the amount of data stored in the FIFO buffer 311 is greater than or equal to a reference amount, the Rm interface unit 310 sends an interrupt signal to OS device driver 330. The OS device driver 330, paged through the interrupt signal, allocates packet buffer fields in a packet buffer pool 331 in step 609, stores the data read from the FIFO buffer 311 in the allocated packet buffer fields in step 611, and puts them in a packet buffer queue 335 in step 613.

In step 615, the controller 390 counts the number of buffer fields allocated from the packet buffer pool 331 and determines whether the number of allocated buffer fields exceeds a threshold $n_{THRESHOLD}$. If it is determined that the number of allocated buffer fields exceeds the threshold $n_{THRESHOLD}$, the controller 390 transitions in step 617 to the CTS-Off state and prevents the Rm interface unit 310 from receiving data from the TE 101. In step 619, the controller 390 starts a timer for counting the CTS waiting time for which the CTS-Off state is kept. However, if it is determined in step 615 that the number of buffer fields allocated from the packet buffer pool 331 does not exceed the threshold $n_{THRESHOLD}$, the controller 390 keeps the CTS-On state. After it ends the process ends, the controller 390 restarts the 1$^{st}$ step 601.

In the data flow control process of FIG. 6, buffers included in modules (function blocks or tasks) of the data flow control apparatus have the buffer structure unified as shown in FIG. 4 so that the amount of data accumulated in a data stack can be accurately measured. Therefore, according to the present invention, overall flow control is possible by simply checking the number of buffer fields allocated from the packet buffer pool 331, thereby reducing a load of the controller 390.

Figure 7:
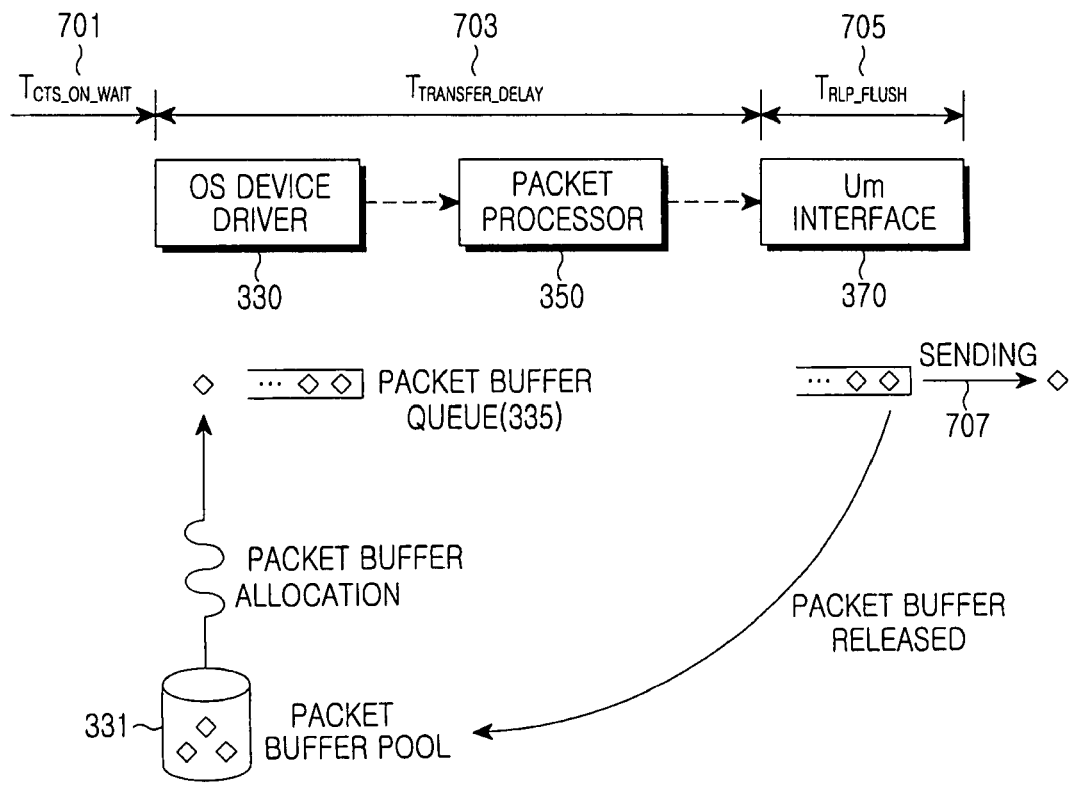
FIG. 7 is a diagram illustrating a buffer capacity calculation method according to an embodiment of the present invention.

FIG. 7 illustrates a buffer capacity decision method according to an embodiment of the present invention.

The proposed buffer capacity decision method defines a CTS waiting time $T_{CTS\_ON\_WAIT}$, a transmission delay time $T_{TRANSFER\_DELAY}$, and a flush time $T_{RLP\_FLUSH\_TIME}$ as follows.

1. CTS waiting time $T_{CTS\_ON\_WAIT}$ 701 is a waiting time required for returning to the CTS-On state after CTS Off as described in FIG. 6, expecting that a predetermined amount of data is transmitted from the Um interface unit 370 to the wireless network and a predetermined available buffer capacity is secured.

2. Transmission delay time $T_{TRANSFER\_DELAY}$ 703 is a time required from the time the data was received from an OS device driver 330 until the time the data is finally transmitted to the wireless network via an Um interface unit 470 after a packet processor 450 is allocated packet buffers from a packet buffer pool 431, stores data in the allocated packet buffers, and puts them in a packet buffer queue 435. The transmission delay time $T_{TRANSFER\_DELAY}$ 703 can include a task scheduling delay time occurring in an OS of the terminal.

3. Flush time $T_{RLP\_FLUSH\_TIME}$ 705 is a waiting time used for determining the time the packet buffer queue 435 empties the data transmitted from the Um interface unit 470.

A detailed description will now be made of a method for calculating an optimal buffer capacity used in the data stack using the above-defined three types of time.

The buffer capacity is determined so as to prevent a buffer underrun state in which a Radio Link Protocol (RLP) data transmission block of the Um interface unit 370 has no more data to transmit. In the worst case scenario where buffer underrun occurs, when the frame first transmitted from RLP was lost and all the other frames were normally transmitted, the transmission delay time $T_{TRANSFER\_DELAY}$ 703 is added, which is required when an RLP packet buffer queue is emptied at a time due to expiration of the flush time $T_{RLP\_FLUSH\_TIME}$ 705 and the data received later after the CTS waiting time $T_{CTS\_ON\_WAIT}$ is delivered to the Um interface unit 370. The Um interface unit 370 in a mobile communication MAC layer transmits every frame with its unique sequence attached thereto, and needs buffering for retransmission. However, because it is not possible to buffer all frames, the packet processor 350 empties a retransmission buffer when a response indicating normal receipt (i.e. Acknowledgment (ACK) signal) is received from a peer entity, or when the flush time $T_{RLP\_FLUSH\_TIME}$ 705 expires.

That is, the RLP layer divides a Service Data Unit (SDU) into small-size frames, and transmits every frame with a unique sequence number inserted therein. A transmitting entity basically performs buffering for retransmission for a predetermined time until it receive the ACK signal and deletes the buffered data upon receipt of an ACK signal. If a previously transmitted frame was lost, the next frames that were acknowledged will still be buffered until retransmission of the lost frame is completed. When retransmission of the lost frame is completed, all the buffered frames are deleted at the same time. In order to prevent underrun in the Um interface unit 370, it is necessary to continue to transmit the next data even when the data maximally buffered for the flush time $T_{RLP\_FLUSH\_TIME}$ 705 is deleted at the same time, and it is also necessary to secure the maximum amount of data to be transmitted for the flush time $T_{RLP\_FLUSH\_TIME}$ 705. Therefore, the maximum buffer capacity of the OS device driver 330 can be calculated depending on the amount of data that the physical layer can transmit at the highest rate for $T_{RLP\_FLUSH\_TIME}+T_{CTS\_ON\_WAIT}+T_{TRANSFER\_DELAY}$.

As is apparent from the foregoing description, according to the present invention, a mobile terminal that performs reverse communication from a high speed communication device to a wireless network can stably control data flow by unifying the buffer structure.

In addition, the present invention presents the stable criteria for calculating the optimal buffer capacity of a mobile terminal that uses an Rm interface and a Um interface in a wireless environment where high speed data processing is required, thereby reducing the required buffer capacity.

Further, the present invention removes a buffer copy operation occurring between modules in a data flow control apparatus of a mobile terminal that performs reverse communication from a high speed communication device to a wireless network, thereby reducing the control load.

Moreover, the present invention can maintain the unique characteristics of the OS device driver while reflecting a transmission protocol characteristic of the Um interface in the Rm interface of the data flow control apparatus.

In addition, according to the present invention, as the data flow control apparatus uses a flow control method which is not dependent on an upper layer, the data flow control apparatus completely meets the reuse requirement of the flow control method as a software element.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A data flow control apparatus of a mobile terminal that performs reverse communication from a high speed communication device to a wireless network, the apparatus comprising:
   an Rm interface unit for receiving data from the high speed communication device and buffering the received data in a byte stream format;

an Operating System (OS) device driver including a first packet buffer queue for reading and storing data buffered in the Rm interface unit upon receipt of an interrupt signal from the Rm interface unit, wherein the OS device driver manages a first linked list for managing data stored in the first packet buffer queue;

a Um interface unit including a second packet buffer queue having the same buffer structure as that of the first packet buffer queue, wherein the Um interface unit manages a second linked list for managing data stored in the second packet buffer queue, converts the data stored in the second packet buffer queue into a frame format, and transmits the frame-format data to the wireless network;

a packet processor for de-linking an address of the data stored in the first packet buffer queue from the first linked list, and linking an address of the de-linked data to the second linked list, to deliver the data from the first packet buffer queue to the second packet buffer queue; and a controller for controlling data flow of the first packet buffer queue.

2. The data flow control apparatus of claim 1, wherein the addresses of the data stored in the first and second packet buffer queues are managed with head pointers and tail pointers, which point a start address and an end address of the first and second linked lists, respectively.

3. The data flow control apparatus of claim 1, wherein the packet processor converts the data stored in the first packet buffer queue to a packet format that can be transmitted via the Um interface unit.

4. The data flow control apparatus of claim 1, wherein the controller interrupts data reception from the high speed communication device for a specific waiting time counted by a Clear-To-Send (CTS) waiting timer when a residual buffer capacity for the data stored in the first packet buffer queue exceeds a predetermined threshold.

5. The data flow control apparatus of claim 4, wherein the capacity of the first packet buffer queue is determined depending on an amount of data that a physical layer can transmit at a highest rate for a summed time of the waiting time, a delay time required when the packet is delivered from the OS device driver to the Um interface unit, and a buffering time set for preventing buffer underrun of the Um interface unit.

6. The data flow control apparatus of claim 1, wherein the OS device driver includes a packet buffer pool in the first packet buffer queue, for managing addresses of packet buffer fields that will store data from the Rm interface unit, and managing use states of the addresses.

7. A data flow control method of a mobile terminal that includes an Rm interface unit for communication with a high speed communication device and a Um interface unit for communication with a wireless network to perform reverse communication from the high speed communication device to the wireless network, the method comprising:

receiving data from the high speed communication device and buffering the received data in the Rm interface unit in a byte stream format;

paging an Operating System (OS) device driver in response to an interrupt signal from the Rm interface unit, reading data buffered in the Rm interface unit, and storing the read data in a first packet buffer queue in the OS device driver;

de-linking an address of the data stored in the first packet buffer queue from a first linked list for managing the first packet buffer queue, and linking an address of the de-linked data to a second linked list for managing a second packet buffer queue included in the Um interface unit, to deliver the data from the first packet buffer queue to the second packet buffer queue; and converting data stored in the second packet buffer queue into a frame format, and transmitting the frame-format data from the Um interface unit to the wireless network.

8. The data flow control method of claim 7, wherein the addresses of the data stored in the first and second packet buffer queues are managed with head pointers and tail pointers, which point a start address and an end address of the first and second linked lists, respectively.

9. The data flow control method of claim 7, further comprising:

converting the data stored in the first packet buffer queue to a packet format that can be transmitted via the Um interface unit, before transmitting the data stored in the first packet buffer queue to the second packet buffer queue.

10. The data flow control method of claim 7, further comprising:

interrupting data reception from the high speed communication device for a specific waiting time counted by a Clear-To-Send (CTS) waiting timer when a residual buffer capacity for the data stored in the first packet buffer queue exceeds a predetermined threshold.

11. The data flow control method of claim 10, wherein the capacity of the first packet buffer queue is determined depending on an amount of data that a physical layer can transmit at a highest rate for a summed time of the waiting time, a delay time required when the packet is delivered from the OS device driver to the Um interface unit, and a buffering time set for preventing buffer underrun of the Um interface unit.

* * * * *